(12) United States Patent
Bamford et al.

(10) Patent No.: US 6,507,853 B2
(45) Date of Patent: Jan. 14, 2003

(54) RECOVERING DATA FROM A FAILED CACHE USING RECOVERY LOGS OF CACHES THAT UPDATED THE DATA

(75) Inventors: Roger J. Bamford, Woodside, CA (US); Boris Klots, Belmont, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/894,521

(22) Filed: Jun. 27, 2001

(65) Prior Publication Data

US 2001/0037342 A1 Nov. 1, 2001

Related U.S. Application Data

(63) Continuation of application No. 09/199,120, filed on Nov. 24, 1998, now Pat. No. 6,353,856.
(60) Provisional application No. 60/074,587, filed on Feb. 13, 1998.

(51) Int. Cl.[7] .............................................. G06F 17/30
(52) U.S. Cl. ...................... 707/203; 707/202; 709/201; 711/118
(58) Field of Search ................................. 707/201, 202, 707/203; 709/201; 711/118

(56) References Cited

U.S. PATENT DOCUMENTS

| | | | |
|---|---|---|---|
| 5,193,162 A | 3/1993 | Bordsen et al. ............. 711/152 |
| 5,276,835 A | 1/1994 | Mohan et al. .............. 711/144 |
| 5,276,848 A | 1/1994 | Gallagher et al. .......... 711/121 |
| 5,280,611 A | 1/1994 | Mohan et al. ................. 707/8 |
| 5,287,473 A | 2/1994 | Mohan et al. .............. 711/133 |
| 5,297,269 A | 3/1994 | Donaldson et al. | |
| 5,327,556 A | 7/1994 | Mohan et al. ................. 707/8 |
| 5,680,576 A | 10/1997 | Laudon | |
| 5,829,032 A | 10/1998 | Komuro et al. | |
| 5,832,516 A | * 11/1998 | Bamford et al. ............ 707/202 |

(List continued on next page.)

FOREIGN PATENT DOCUMENTS

| | | |
|---|---|---|
| EP | 0 471 282 A2 | 2/1992 |
| EP | 0 657 813 | 6/1995 |
| EP | O750260 A2 | 6/1996 |

OTHER PUBLICATIONS

Abstracts of Some of C. Mohan's Papers and Patents, Updated on Jun. 13, 2001, www.almaden.ibm.com/u/mohan/aries_papers.html, (pp. 1–38), accessed Jul. 24, 2001.
C. Mohan, et al., "A Case Study of Problems in Migrating to Distributed Computing: Data Base Recovery Using Multiple Logs in the Shared Disks Environment", IBM Research Report RJ7343, Database Technology Institute, IBM Almaden Research Center, Mar. 1990, (20) pp. 1–20.

(List continued on next page.)

*Primary Examiner*—John Breene
*Assistant Examiner*—Cheryl Lewis
(74) *Attorney, Agent, or Firm*—Hickman Palermo Truong & Becker LLP; Craig G. Holmes

(57) ABSTRACT

A method and apparatus are provided for transferring a resource from the cache of one database server to the cache of another database server without first writing the resource to disk. When a database server (Requestor) desires to modify a resource, the Requestor asks for the current version of the resource. The database server that has the current version (Holder) directly ships the current version to the Requestor. Upon shipping the version, the Holder loses permission to modify the resource, but continues to retain the resource in memory. When the retained version of the resource, or a later version thereof, is written to disk, the Holder can discard the retained version of the resource. Otherwise, the Holder does not discard the retained version. Using this technique, single-server failures are recovered without having to merge the recovery logs of the various database servers that had access to the resource.

3 Claims, 6 Drawing Sheets

U.S. PATENT DOCUMENTS

| | | | | |
|---|---|---|---|---|
| 5,903,910 | A | | 5/1999 | Tran et al. ................... 711/132 |
| 5,924,096 | A | | 7/1999 | Draper et al. .................. 707/10 |
| 5,966,706 | A | | 10/1999 | Biliris et al. ................... 707/10 |
| 5,987,477 | A | | 11/1999 | Schmuck et al. ........... 707/201 |
| 6,052,758 | A | | 4/2000 | Crockett et al. ............ 711/113 |
| 6,085,198 | A | | 7/2000 | Skinner et al. ............. 707/101 |
| 6,092,157 | A | | 7/2000 | Suzuki |
| 6,151,607 | A | * | 11/2000 | Lomet ........................ 707/202 |
| 6,154,811 | A | * | 11/2000 | Srbljic et al. ............... 711/118 |
| 6,256,712 | B1 | | 7/2001 | Challenger et al. ......... 711/141 |
| 6,279,084 | B1 | * | 8/2001 | VanDoren et al. .......... 711/141 |
| 6,353,836 | B1 | | 3/2002 | Bamford et al. |

OTHER PUBLICATIONS

Recovery and Coherency–Control Protocols for Fast Intersystem Page Transfer and Fine–Granularity Locking in a Shared Disks Transaction Environment, C. Mohan and Inderpal Narang, Proceedings of the $17^{th}$ International Conference on Very Large Data Bases, Barcelona, Sep., 1991 (pp. 193–207).

Research Report RJ8017 entitled "Recovery and Coherency–Control Products for Fast Intersystem Page Transfer and Fine–Granularity Locking in a Shared Disks Transaction Environment", C. Mohan and Inderpal Narang, Data Base Technology Institute, IBM Almaden Research Center, Mar. 15, 1991 (31pgs.). pp. 1–31.

C. Mohan, et al., "Solutions to Hot Spot Problems in a Shared Disks Transaction Environment", IBM Research Report RJ8281, Data Base Technology Institute, IBM Alamaden Research Center, Aug. 1991, (25 pages), pp. 1–25.

Mohan, C., et al., "Efficient Locking and Caching of Data in the Multisystem Shared Disks Transactions Environment", Proc. $3^{rd}$ International Conference on Extending Database Technology, Viennia, Mar. 1991, pp. 453–468.

C. Mohan, et al., "Efficient Locking and Caching of Data in the Multisystem Shared Disks Transaction Environment", Data Base Technology Institute, IBM Almaden Research Center, RJ 8301, Aug. 1991, 20 pages. pp. 1–20.

C. Mohan, et al., "Data Base Recovery in Shared Disks and Client–Server Architectures", Proc. $12^{th}$ International Conference on Distributed Computing Systems, Yokohama, Jun. 1992, pp. 310–317.

C. Mohan, et al., "Data Base Recovery in Shared Disks and Client–Server Architectures", IBM Research Report RJ8685, Data Base Technology Institute, IBM Almaden Research Center, Mar. 1992, 20 pages, pp. 1–20.

J. W. Josten, et al., "DB2's Use of the Coupling Facility for Data Sharing", IBM Systems Journal, vol. 36, No. 2, 1997, 25 pages, pp. 1–25.

Rana Ejaz Ahmed, et al., "Cache–Aided Rollback Error Recovery (CARER) Algorithms for Shared–Memory Multiprocessor Systems," 1990, IEEE, pp. 82–88.

Anne–Marie Kermarrec, et al., "A Recoverable Distributed Shared Memory Integrating Coherence and Recoverability," Jun. 27, 1995, IEEE, XP 000597800, pp. 289–298.

Michael J. Feeley, et al., "Implementing Global Memory Mangement in a Workstation Cluster," SIGOPS 95, Dec. 1995, XP 000584826, pp. 201–212.

* cited by examiner

RECOVERING DATA FROM A FAILED CACHE USING RECOVERY LOGS OF CACHES THAT UPDATED THE DATA

RELATED APPLICATIONS

This application claims domestic priority as a continuation application of prior U.S. application Ser. No. 09/199,120, filed Nov. 24, 1998, U.S. Pat. No. 6,353,836, entitled "Method and Apparatus for Transferring Data from the Cache of One Node to the Cache of Another Node," naming as inventors Roger J. Bamford and Boris Klots, which claims the benefit of U.S. Provisional Application Ser. No. 60/074,587, filed Feb. 13, 1998, entitled "Cache Fusion," naming as inventors Roger J. Bamford and Boris Klots, the entire disclosures of both of which are hereby incorporated by reference for all purposes as if fully set forth herein.

The present application is related to the following commonly-assigned U.S. patent applications, all of which are continuation applications of prior U.S. application Ser. No. 09/199,120, filed Nov. 24, 1998, U.S. Pat. No. 6,353,836 titled "Method and Apparatus for Transferring Data from the Cache of One Node to the Cache of Another Node," naming as inventors Roger J. Bamford and Boris Klots:

U.S. application Ser. No. 09/894,640, filed Jun. 27, 2001, entitled "Using a Checkpoint to Manage Data that is Shared By a Plurality of Nodes" and naming as inventors Roger J. Bamford and Boris Klots;

U.S. application Ser. No. 09/894,636, filed Jun. 27, 2001, entitled "Transferring a Resource Between Caches of Different Nodes" and naming as inventors Roger J. Bamford and Boris Klots;

U.S. application Ser. No. 09/894,325, filed Jun. 27, 2001, entitled "Managing Recovery of Data After Failure of One or More Caches" and naming as inventors Roger J. Bamford and Boris Klots;

U.S. application Ser. No. 09/894,757, filed Jun. 27, 2001, entitled "Recovering Data from a Failed Cache Using a Surviving Cache" and naming as inventors Roger J. Bamford and Boris Klots; and U.S. application Ser. No. 09/894,635, filed Jun. 27, 2001, entitled "Managing a Resource Used by a Plurality of Nodes" and naming as inventors Roger J. Bamford and Boris Klots.

FIELD OF THE INVENTION

The present invention relates to techniques for reducing the penalty associated with one node requesting data from a data store when the most recent version of the requested data resides in the cache of another node.

BACKGROUND OF THE INVENTION

To improve scalability, some database systems permit more than one database server (each running separately) to concurrently access shared storage such as stored on disk media. Each database server has a cache for caching shared resources, such as disk blocks. Such systems are referred to herein as parallel server systems.

One problem associated with parallel server systems is the potential for what are referred to as "pings". A ping occurs when the version of a resource that resides in the cache of one server must be supplied to the cache of a different server. Thus, a ping occurs when, after a database server A modifies resource x in its cache, a database server B requires resource x for modification. Database servers A and B would typically run on different nodes, but in some cases might run on the same node.

One approach to handling pings is referred to herein as the "disk intervention" approach. The disk intervention approach uses a disk as intermediary storage to transfer the latest version of the resource between two caches. Thus, in the example given above, the disk intervention approach requires database server 1 to write its cache version of resource x to disk, and for database server 2 to retrieve this version from disk into its cache. The disk intervention approach's reliance on two disk I/Os per inter-server transfer of a resource limits the scalability of parallel server systems. Specifically, the disk I/Os required to handle a ping are relatively expensive and time consuming, and the more database servers that are added to the system, the higher the number of pings.

However, the disk intervention approach does provide for relatively efficient recovery from single database server failures, in that such recovery only needs to apply the recovery (redo) log of the failed database server. Applying the redo log of the failed database server ensures that all of the committed changes that transactions on the failed database server made to the resources in the cache of the failed server are recovered. The use of redo logs during recovery are described in detail in U.S. patent application Ser. No. 08/784,611, U.S. Pat. No. 5,832,516 entitled "CACHING DATA IN RECOVERABLE OBJECTS", filed on Jan. 21, 1997, the contents of which are incorporated herein by reference.

Parallel server systems that employ the disk intervention approach typically use a protocol in which all global arbitration regarding resource access and modifications is performed by a Distributed Lock Manager (DLM). The operation of an exemplary DLM is described in detail in U.S. patent application Ser. No. 08/669,689, entitled "METHOD AND APPARATUS FOR LOCK CACHING", filed on Jun. 24, 1996, pending the contents of which are incorporated herein by reference.

In typical Distributed Lock Manager systems, information pertaining to any given resource is stored in a lock object that corresponds to the resource. Each lock object is stored in the memory of a single node. The lock manager that resides on the node on which a lock object is stored is referred to as the Master of that lock object and the resource it covers.

In systems that employ the disk intervention approach to handling pings, pings tend to involve the DLM in a variety of lock-related communications. Specifically, when a database server (the "requesting server") needs to access a resource, the database server checks to see whether it has the desired resource locked in the appropriate mode: either shared in case of a read, or exclusive in case of a write. If the requesting database server does not have the desired resource locked in the right mode, or does not have any lock on the resource, then the requesting server sends a request to the Master for the resource to acquire the lock in specified mode.

The request made by the requesting database server may conflict with the current state of the resource (e.g. there could be another database server which currently holds an exclusive lock on the resource). If there is no conflict, the Master for the resource grants the lock and registers the grant. In case of a conflict, the Master of the resource initiates a conflict resolution protocol. The Master of the resource instructs the database server that holds the conflicting lock (the "Holder") to downgrade its lock to a lower compatible mode.

Unfortunately, if the Holder (e.g. database server A) currently has an updated ("dirty") version of the desired resource in its cache, it cannot immediately downgrade its lock. In order to downgrade its lock, database server A goes through what is referred to as a "hard ping" protocol. According to the hard ping protocol, database server A forces the redo log associated with the update to be written to disk, writes the resource to disk, downgrades its lock and notifies the Master that database server A is done. Upon receiving the notification, the Master registers the lock grant and notifies the requesting server that the requested lock has been granted. At this point, the requesting server B reads the resource into its cache from disk.

As described above, the disk intervention approach does not allow a resource that has been updated by one database server (a "dirty resource") to be directly shipped to another database server. Such direct shipment is rendered unfeasible due to recovery related problems. For example, assume that a resource is modified at database server A, and then is shipped directly to database server B. At database server B, the resource is also modified and then shipped back to database server A. At database server A, the resource is modified a third time. Assume also that each server stores all redo logs to disk before sending the resource to another server to allow the recipient to depend on prior changes.

After the third update, assume that database server A dies. The log of database server A contains records of modifications to the resource with a hole. Specifically, server A's log does not include those modifications which were done by database server B. Rather, the modifications made by server B are stored in the database server B's log. At this point, to recover the resource, the two logs must be merged before being applied. This log merge operation, if implemented, would require time and resources proportional to the total number of database servers, including those that did not fail.

The disk intervention approach mentioned above avoids the problem associated with merging recovery logs after a failure, but penalizes the performance of steady state parallel server systems in favor of simple and efficient recovery. The direct shipment approach avoids the overhead associated with the disk intervention approach, but involves complex and nonscalable recovery operations in case of failures.

Based on the foregoing, it is clearly desirable to provide a system and method for reducing the overhead associated with a ping without severely increasing the complexity or duration of recovery operations.

SUMMARY OF THE INVENTION

A method and apparatus are provided for transferring a resource from the cache of one database server to the cache of another database server without first writing the resource to disk. When a database server (Requestor) desires to modify a resource, the Requestor asks for the current version of the resource. The database server that has the current version (Holder) directly ships the current version to the Requestor. Upon shipping the version, the Holder loses permission to modify the resource, but continues to retain a copy of the resource in memory. When the retained version of the resource, or a later version thereof, is written to disk, the Holder can discard the retained version of the resource. Otherwise, the Holder does not discard the retained version. In the case of a server failure, the prior copies of all resources with modifications in the failed server's redo log are used, as necessary, as starting points for applying the failed server's redo log. Using this technique, single-server failures (the most common form of failure) are recovered without having to merge the recovery logs of the various database servers that had access to the resource.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus for reducing the overhead associated with a ping is described. In the following description, for the purposes of explanation, numerous specific details are set forth in order to provide a thorough understanding of the present invention. It will be apparent, however, to one skilled in the art that the present invention may be practiced without these specific details. In other database servers, well-known structures and devices are shown in block diagram form in order to avoid unnecessarily obscuring the present invention.

Functional Overview

According to one aspect of the invention, pings are handled by shipping updated versions of resources directly between database servers without first being stored to disk, thus avoiding the I/O overhead associated with the disk intervention approach. Further, the difficulties associated with single-instance failure recovery are avoided by preventing a modified version of a resource from being replaced in cache until the modified resource or some successor thereof has been written to disk, even if the resource has been transferred to another cache.

For the purpose of explanation, a copy of a resource that cannot be replaced in cache is referred to herein as a "pinned" resource. The act of making a pinned resource replaceable is referred to as "releasing" the resource.

The M and W Lock Approach

According to one aspect of the invention, the modify and write-to-disk permissions for a resource are separated. Thus, a database server that has permission to write an updated version of a resource from cache to disk does not necessarily have permission to update the resource. Conversely, a database server that has permission to modify a cached version of a resource does not necessarily have permission to write that cached version to disk.

According to one embodiment, this separation of permissions is enforced through the use of special locks. Specifically, the permission to modify a resource may be granted by a "M" lock, while the permission to write a resource to disk may be granted by a "W" lock. However, it should be noted that the use of M and W locks as described herein represents but one mechanism for preventing a transferred version of a resource from being replaced in cache until that version or a successor thereof is written to disk.

Figure 2:
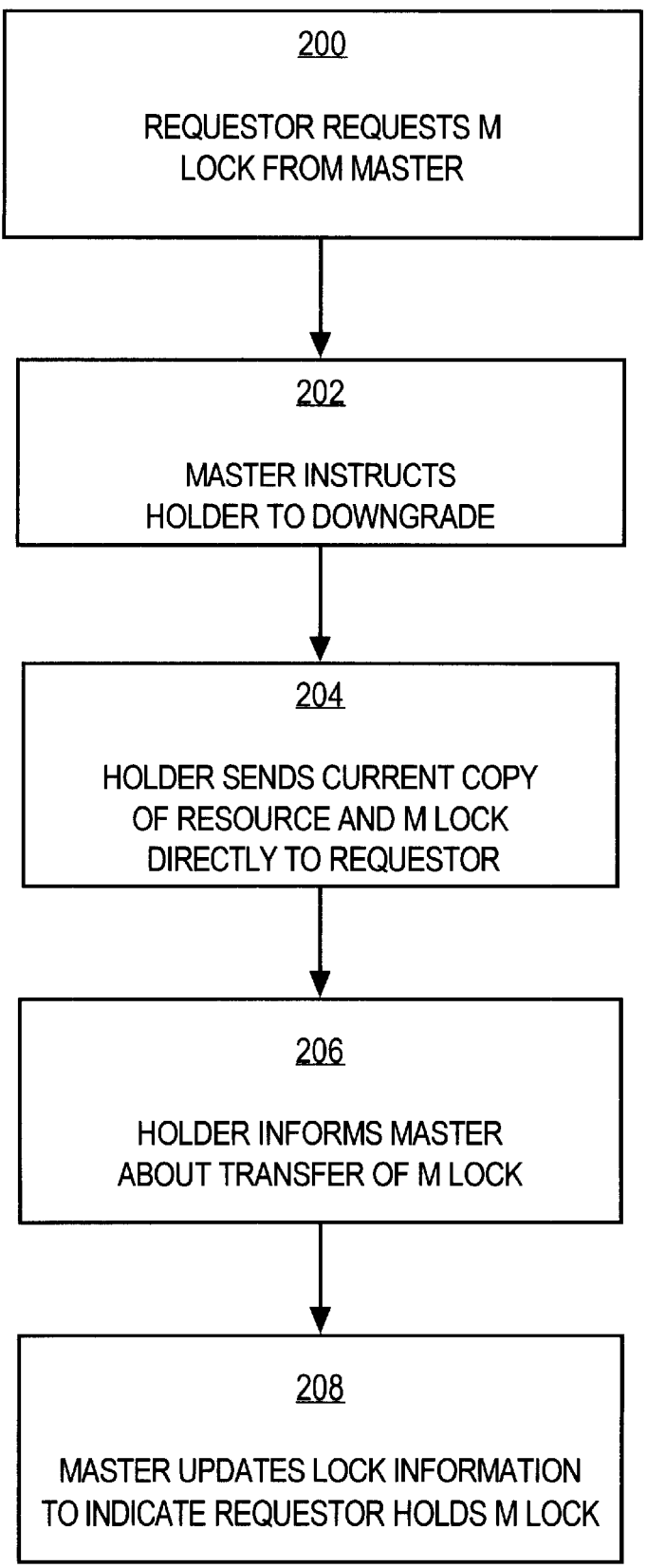
FIG. 2 is a flowchart illustrating steps for transmitting a resource from one cache to another without disk intervention according to an embodiment of the invention.

Referring to FIG. 2, it illustrates the steps performed in response to a ping in a database system that uses M and W locks, according to one embodiment of the invention. At step 200, a database server that desires to modify a resource requests the M lock from the Master for the resource (i.e. the database server that manages the locks for the resource). At step 202, the Master instructs the database server currently holding the M lock for the resource ("the Holder") to transfer the M lock together with its cached version of the resource to the requesting database server via direct transfer over the communication channel(s) connecting the two servers (the "interconnect").

At step 204, the Holder sends the current version of the resource and the M lock to the Requestor. At step 206, the Holder informs the Master about the transfer of the M lock. At step 208, the Master updates the lock information for the resource to indicate that the Requestor now holds the M lock.

PI Resources

The holder of the M lock does not necessarily have the W lock, and therefore may not have permission to write the version of the resource that is contained in its cache out to disk. The transferring database server (i.e. the database server that last held the M lock) therefore continues to pin its version of the resource in dynamic memory because it may be asked to write out its version to disk at some future point, as described below. The version of the resource that remains in the transferring database server will become out-of-date if the receiving database server modifies its copy of the resource. The transferring database server will not necessarily know when the receiving database server (or a successor thereof) modifies the resource, so from the time the transferring database server sends a copy of the resource, it treats its retained version as "potentially out-of-date". Such potentially out-of-date versions of a resource are referred to herein as past-image resources (PI resources).

Releasing PI Resources

After a cached version of a resource is released, it may be overwritten with new data. Typically, a dirty version of a resource may be released by writing the resource to disk. However, database servers with PI resources in cache do not necessarily have the right to store the PI resources to disk. One technique for releasing PI resources under these circumstances is illustrated in FIG. 3.

Figure 3:
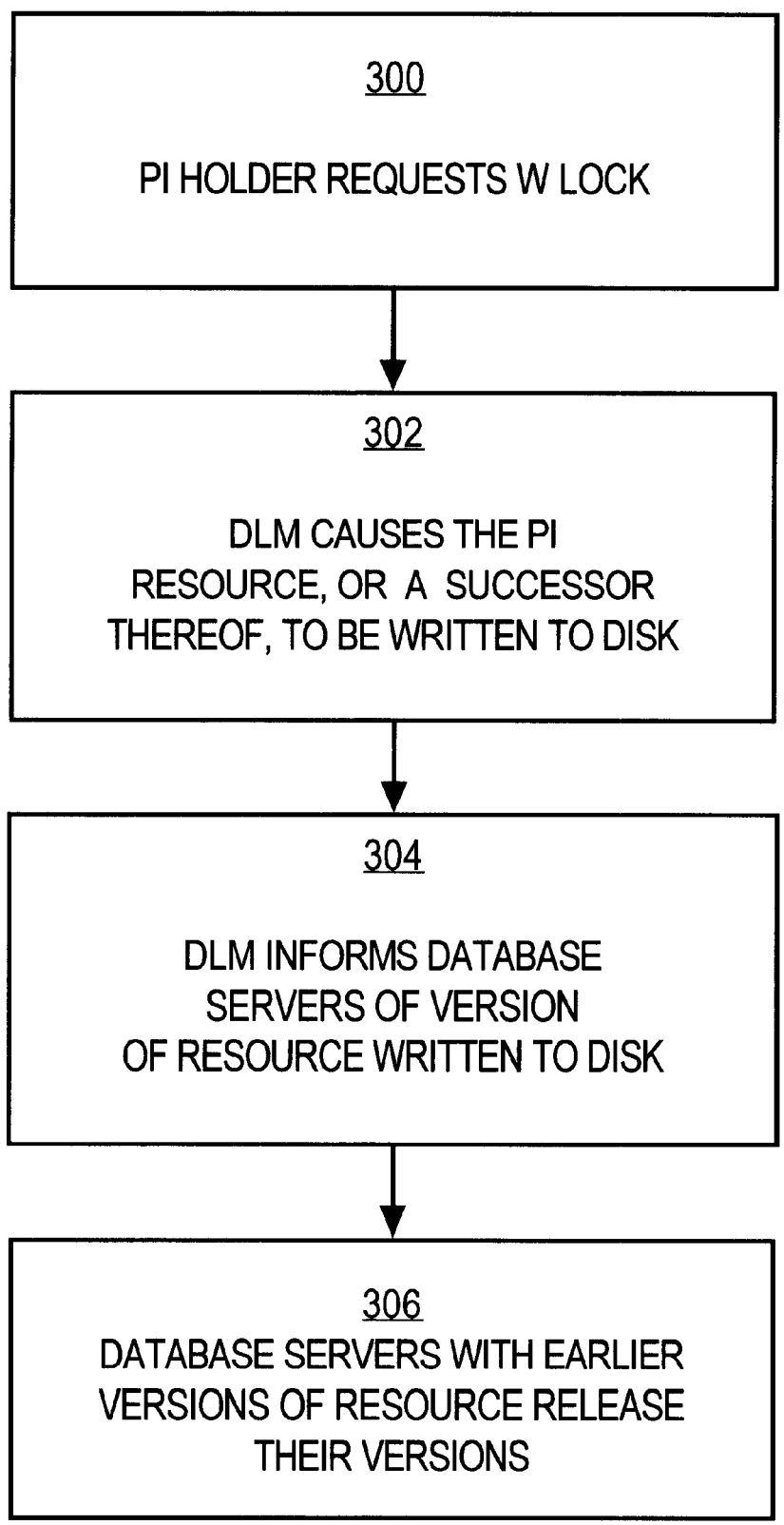
FIG. 3 is a flowchart illustrating steps for releasing past images of resources, according to an embodiment of the invention.

Referring to FIG. 3, when a database server wishes to release a PI resource in its cache, it sends a request for the W lock (step 300) to the distributed lock manager (DLM). In step 302, the DLM then orders the requesting database server, or some database server that has a later version of the resource (a successor) in its cache, to write the resource out to disk. The database server thus ordered to write the resource to disk is granted the W lock. After the database server that was granted the W lock writes the resource to disk, the database server releases the W lock.

The DLM then sends out a message to all database servers indicating the version of the resource written out (step 304), so that all earlier PI versions of the resource can be released (step 306). For example, assume that the version written to disk was modified at time T10. A database server with a version of the resource that was last modified at an earlier time T5 could now use the buffer in which it is stored for other data. A database server with a version that was modified at a later time T11, however, would have to continue to retain its version of the resource in its memory.

Ping Management Under the M and W Lock Approach

Figure 1:
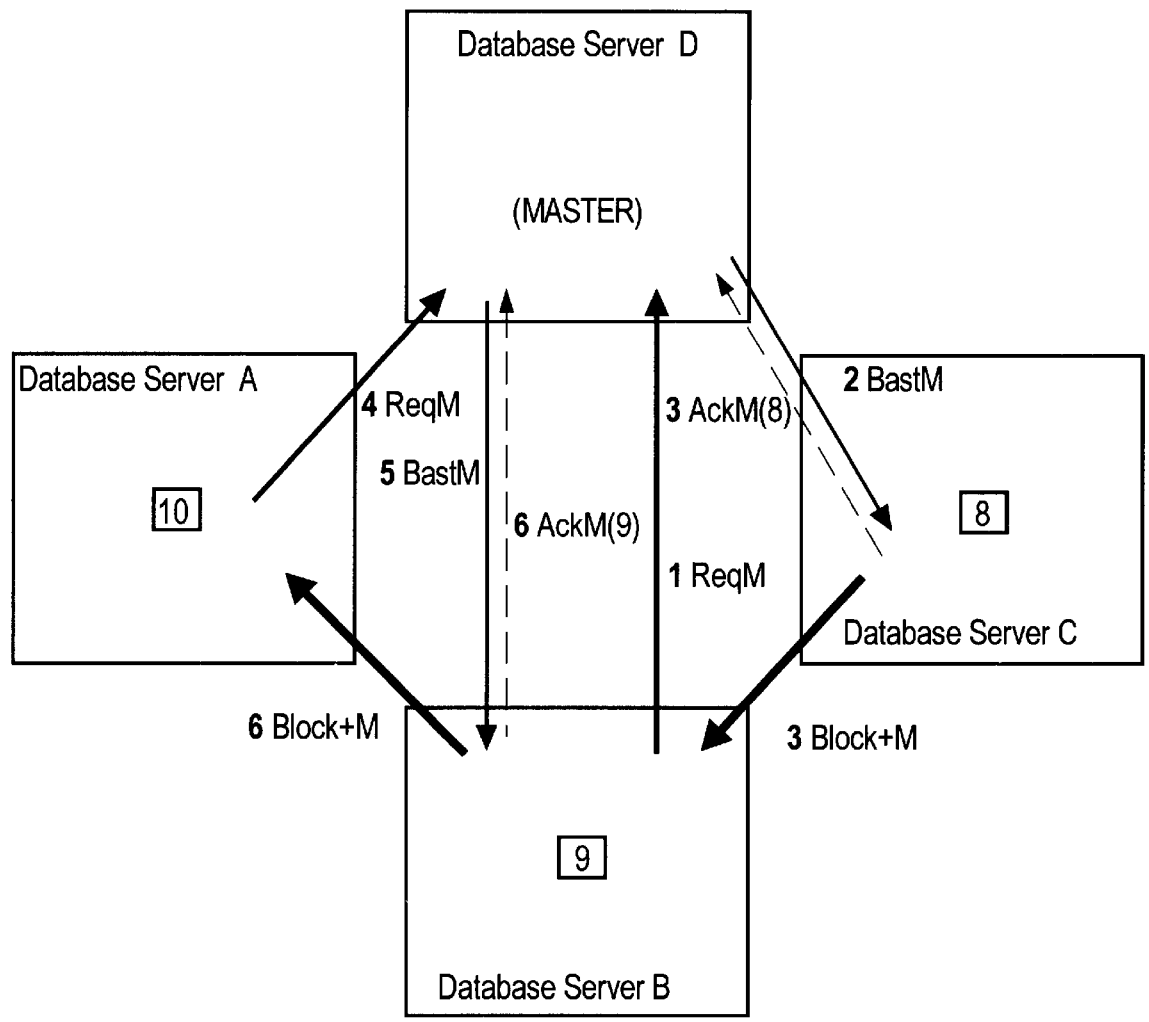
FIG. 1 is a block diagram illustrating cache to cache transfers of the most recent versions of resources.

According to one embodiment of the invention, the M and W lock approach may be implemented to handle pings as shall now be described with reference to FIG. 1. Referring to FIG. 1, it is a block diagram that illustrates four database servers A, B, C and D, all of which have access to a database that contains a particular resource. At the time illustrated, database servers A, B and C all have versions of the resource. The version held in the cache of database server A is the most recently modified version of the resource (modified at time T10). The versions held in database servers B and C are PI versions of the resource. Database server D is the Master for the resource.

At this point, assume that another database server (the "Requestor") desires to modify the resource. The Requestor requests the modify lock from the Master. The Master sends a command to database server A to down-convert the lock (a "BAST") due to the conflicting request from the Requestor. In response to the down-convert command, the current image of the resource (whether clean or dirty) is shipped from database server A to the Requestor, together with a permission to modify the resource. The permission thus shipped does not include a permission to write the resource to disk.

When database server A passes the M lock to the Requestor, database server A downgrades his M lock to a "hold" lock (and "H lock"). The H lock indicates that the database server A is holding a pinned PI copy. Ownership of an H lock obligates the owner to keep the PI copy in its buffer cache, but does not give the database server any rights to write the PI copy to disk. There can be multiple concurrent H holders for the same resource, but not more than one database server at a time can write the resource, therefore only one database server can hold a W lock on the resource.

Prior to shipping the resource, database server A makes sure that the log is forced (i.e. that the recovery log generated for the changes made by database server A to the resource are durably stored). By passing the modification permission, database server A loses its own right to modify the resource. The copy of the resource (as it was just at the moment of shipping) is still kept at the shipping database server A. After the shipment of the resource, the copy of the resource retained in database server A is a PI resource.

Courtesy Writes

After a database server ships a dirty resource directly to another database server, the retained copy of the resource becomes a pinned PI resource whose buffer cannot be used for another resource until released. The buffers that contain PI resources are referred to herein as PI buffers. These buffers occupy valuable space in the caches of the database servers, and eventually have to be reused for other data.

To replace PI buffers in the buffer cache (to be aged out or checkpointed) a new disk write protocol, referred to herein as "courtesy writes", is employed. According to the courtesy write protocol, when a database server needs to write a resource to disk, the database server sends the request to the DLM. The DLM selects a version of the resource to be written to disk, finds the database server that has the selected version, and causes that database server to write the resource to disk on behalf of the database server which initiated the write request. The database server that actually writes the resource to disk may be the database server which requested the write, or some other database server, depending on the latest trajectory of the resource.

Writing the selected version of the resource to disk releases all PI versions of the resource in all buffer caches of a cluster that are as old or older than the selected version that was written to disk. The criteria used to select the version that will be written to disk shall be described in greater detail hereafter. However, the selected version can be either the latest PI version known to the Master or the current version ("CURR") of the resource. One benefit of selecting a version other than the current version is that selection of another version leaves the current copy uninterruptedly available for modifications.

A database server that is holding a PI resource can write out its PI copy provided that it has acquired a W lock on the resource. The writes of the resource are decoupled from the migration of the CURR resource image among the various database servers.

Efficiency Factors

There is no need to write a PI copy each time a resource is shipped to another database server. Therefore, the goal of durably storing resources is to keep the disk copies recent enough, and to keep the number of non-replaceable resources in the buffer caches reasonable. Various factors determine the efficiency of a system that employs the courtesy write protocol described above. Specifically, it is desirable to:

(1) minimize I/O activity caused by writing dirty resources to disk;
(2) keep the disk versions of resources current enough to speed up recovery operations after a failure; and
(3) prevent overflow of the buffer cache with pinned PI resources.

Maximizing the first criteria has a negative impact on the second and third criteria, and visa versa. Therefore, a trade off is necessary. According to one embodiment of the invention, a self-tuning algorithm may be used which combines different techniques of checkpointing (LRU mixed with occasional continuous checkpointing) coupled with a control over the total I/O budget.

The Newer-write Approach

An alternative to the courtesy-write protocol described above is referred to herein as the write-newer approach. According to the write-newer approach, all database servers have permission to write their PI resources to disk. However, prior to doing so, a database server acquires a lock on the disk-based copy of the resource. After acquiring the lock, the database server compares the disk version with the PI version that it desires to write. If the disk version is older, then the PI version is written to disk. If the disk version is newer, then the PI version may be discarded and the buffer that it occupied may be reused.

Unlike the courtesy-write protocol, the newer-write approach allows a database server to release its own PI version, either by writing it to disk or determining that the disk version is newer. However, the newer-write approach increases contention for the lock of the disk-based copy, and may incur a disk-I/O that would not have been incurred with the courtesy-write approach.

Permission Strings

Typical DLMs govern access to resources through the use of a limited number of lock modes, where the modes are either compatible or conflicting. According to one embodiment, the mechanism for governing access to resources is expanded to substitute lock modes with a collection of different kinds of permissions and obligations. The permissions and obligations may include, for example, the permission to write a resource, to modify a resource, to keep a resource in cache, etc. Specific permissions and obligations are described in greater detail below.

According to one embodiment, permissions and obligations are encoded in permission strings. A permission string might be augmented by a resource version number since many permissions are related to a version of a resource rather than to the resource itself. Two different permission strings are conflicting if they demand the same exclusive permission for the same version of the resource (e.g. current version for modification or a disk access for write). Otherwise they are compatible.

Concurrency Using Permission Transfers

As mentioned above, when a resource is modified at one database server and is requested for further modifications by another database server, the Master instructs the database server that holds the current copy (CURR copy) of the resource to pass its M lock (the right to modify) together with the CURR copy of the resource to the other database server. Significantly, though the request for the M lock is sent to the master, the grant is done by some other database server (the previous M lock holder). This triangular messaging model deviates significantly from the traditional two-way communication where the response to a lock request is expected from the database server containing the lock manager to which the lock request was initially addressed.

According to one embodiment of the invention, when the holder of the CURR copy of a resource (e.g. database server A) passes the M lock to another database server, database server A notifies the Master that the M lock has been transferred. However, database server A does not wait for acknowledgment that the Master received the notification, but sends the CURR copy and the M lock prior to receiving such acknowledgement. By not waiting, the round trip communication between the master and database server A does not impose a delay on the transfer, thereby yielding a considerable saving on the protocol latencies.

Because permissions are transferred directly from the current holder of the permission to the requestor of the permission, the Master does not always know the exact global picture of the lock grants. Rather, the Master knows only about the trajectory of the M lock, about the database servers which just 'held it lately', but not about the exact location of the lock at any given time. According to one embodiment, this "lazy" notification scheme is applicable to the M locks but not to W, X, or S locks (or their counterparts). Various embodiments of a locking scheme are described in greater detail below.

Failure Recovery

Figure 4:
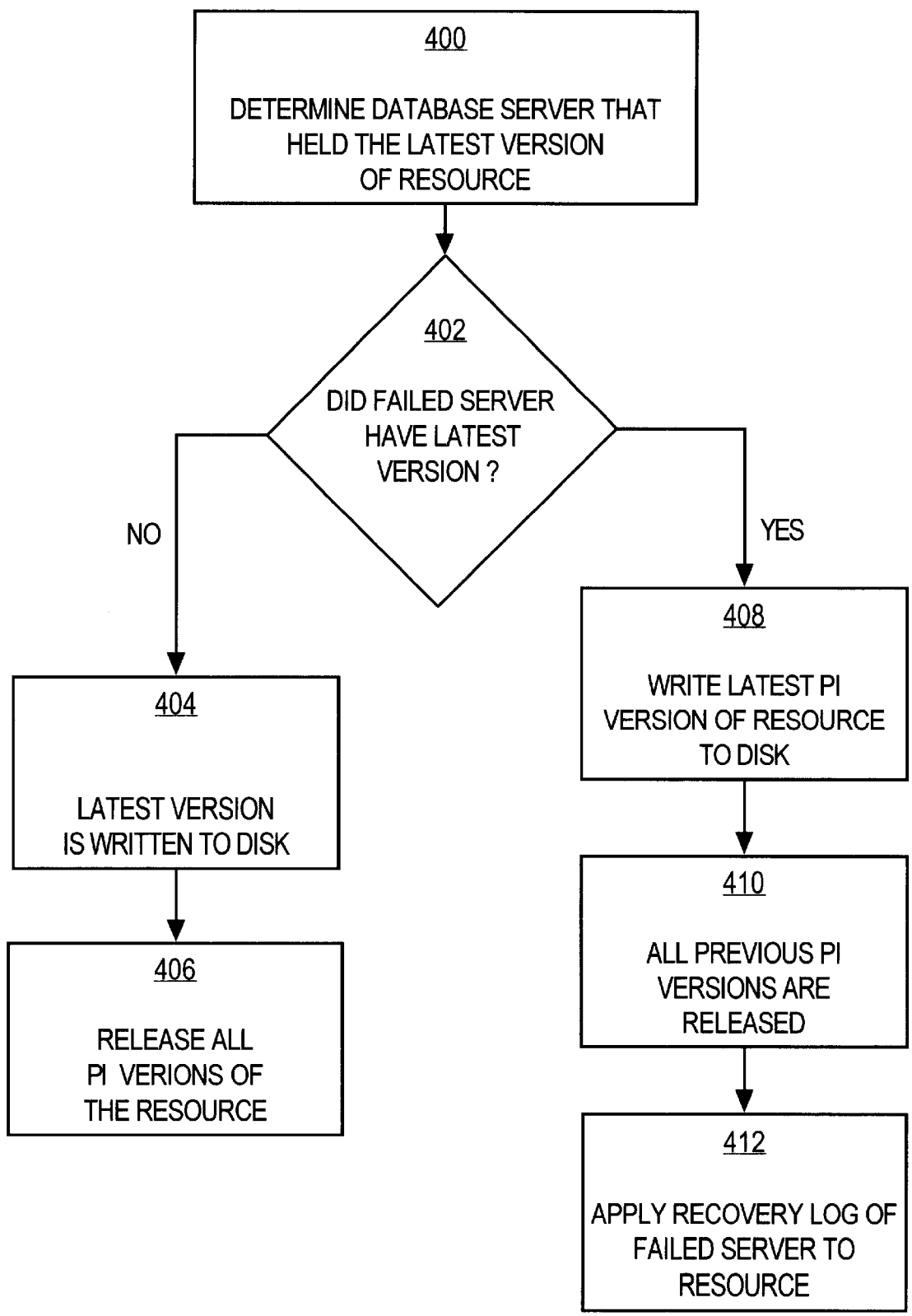
FIG. 4 is a flowchart illustrating steps for recovering after a single database server failure according to an embodiment of the invention.

Within the context of the present invention, a database server is said to have failed if a cache associated with the server becomes inaccessible. Database systems that employ the direct, inter-server shipment of dirty resources using the techniques described herein avoid the need for merging recovery logs in response to a single-server failure. According to one embodiment, single-server failures are handled as illustrated in FIG. 4. Referring to FIG. 4, upon a single-database server failure, the recovery process performs the following for each resource held in the cache of the failed database server:

(step 400) determine the database server that held the latest version of the resource;

(step 402) if the database server determined in step 400 is not the failed database server, then (step 404) the determined database server writes its cached version of the resource to disk and (step 406) all PI versions of the resource are released. This version will have all the committed changes made to the resource (including those made by the failed database server) and thus no recovery log of any database server need be applied.

If the database server determined in step 402 is the failed database server, then (step 408) the database server holding the latest PI version of the resource writes out its cached version of the resource to disk and (step 410) all previous PI versions are released. The version written out to disk will have the committed changes made to the resource by all database servers except the failed database server. The recovery log of the failed database server is applied (step 412) to recover the committed changes made by the failed database server.

Alternatively, the latest PI version of the resource may be used as the starting point for recovering the current version in cache, rather than on disk. Specifically, the appropriate records from the recovery log of the failed database server may be applied directly to the latest PI version that resides in cache, thus reconstructing the current version in the cache of the database server that holds the latest PI version.

Multiple Database Server Failure

In case of a multiple server failure, when neither the latest PI copy nor any CURR copy have survived, it may happen that the changes made to the resource are spread over multiple logs of the failed database servers. Under these conditions, the logs of the failed database servers must be merged. However, only the logs of the failed database servers must be merged, and not logs of all database servers. Thus, the amount of work required for recovery is proportional to the extent of the failure and not to the size of the total configuration.

In systems where it is possible to determine which failed database servers updated the resource, only the logs of the failed database servers that updated the resource need to be merged and applied. Similarly, in systems where it is possible to determine which failed database servers updated the resource subsequent to the durably stored version of the resource, only the logs of the failed database servers that updated the resource subsequent to the durably stored version of the resource need to be merged and applied.

Exemplary Operation

For the purpose of explanation, an exemplary series of resource transfers shall be described with reference to FIG. 1. During the series of transfers, a resource is accessed at multiple database servers. Specifically, the resource is shipped along a cluster of nodes for modifications, and then a checkpoint at one of the database servers causes a physical I/O of this resource.

Referring again to FIG. 1, there are 4 database servers: A,B,C, and D. Database server D is the master of the resource. Database server C first modifies the resource. Database server C has resource version 8. At this point, database server C also has an M lock (an exclusive modification right) on this resource.

Assume that at this point, database server B wants to modify the resource that database server C currently holds.

Database server B sends a request (1) for an M lock on the resource. Database server D puts the request on a modifiers queue associated with the resource and instructs (message 2: BAST) database server C to:

(a) pass modification permission (M lock) to database server B, (b) send current image of the resource to database server B, and (c) downgrade database server C's M lock to an H lock.

After this downgrade operation, C is obligated to keep its version of the resource (the PI copy) in its buffer cache.

Database server C performs the requested operations, and may additionally force the log on the new changes. In addition, database server C lazily notifies (3 AckM) the Master that it has performed the operations (AST). The notification also informs the Master that database server C keeps version 8. Database server C does not wait for any acknowledgment from the Master. Consequently, it is possible that database server B gets an M lock before the Master knows about it.

Meanwhile, assume that database server A also decides to modify the resource. Database server A sends a message (4) to database server D. This message may arrive before the asynchronous notification from database server C to database server D.

Database server D (the Master) sends a message (5) to database server B, the last known modifier of this resource, to pass the resource (after B gets and modifies it) to database server A. Note that database server D does not know whether the resource is there or not yet. But database server D knows that the resource will eventually arrive at B.

After database server B gets the resource and makes the intended changes (now B has version 9 of the resource), it downgrades its own lock to H, sends (6) the current version of the resource ("CURR resource") to database server A together with the M lock. Database server B also sends a lazy notification (6 AckM) to the Master.

While this resource is being modified at database server A, assume that a checkpointing mechanism at database server C decides to write the resource to disk. Regarding the asynchronous events described above, assume that both 3 AckM and 6 AckM have already arrived to the master. The operations performed in response to the checkpointing operation are illustrated with reference to FIG. 5.

Figure 5:
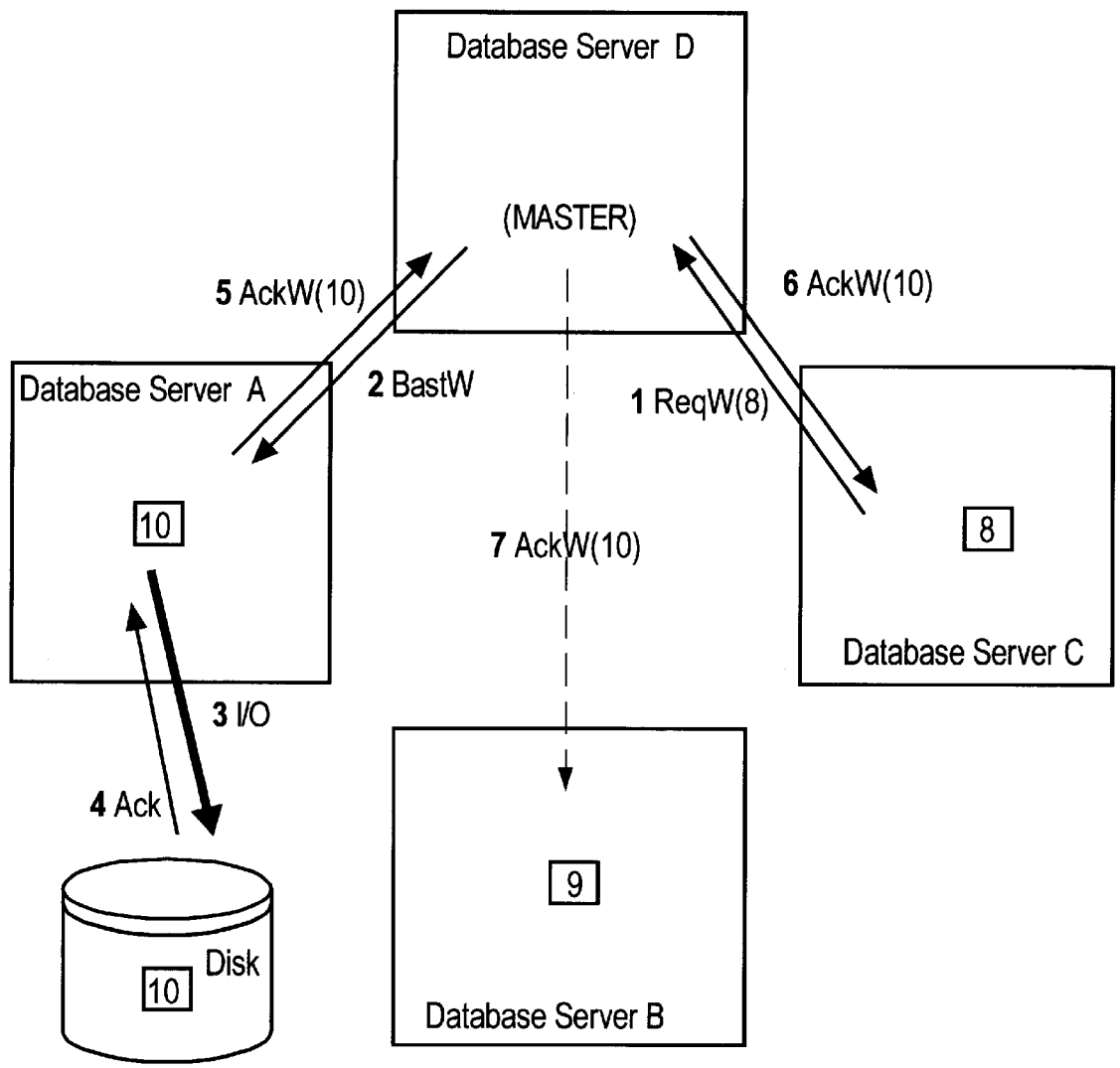
FIG. 5 is a block diagram illustrating a checkpoint cycle according to an embodiment of the invention.

Referring to FIG. 5, since database server C holds an H lock on version 8, which does not include a writing privilege, database server C sends message 1 to the Master (D) requesting the W (write) lock for its version. At this point in time, the Master knows that the resource was shipped to database server A (assuming that the acknowledgments have arrived). Database server D sends an (unsolicited) W lock to database server A (2 BastW) with the instruction to write the resource.

In the general case, this instruction is sent to the last database server whose send notification has arrived (or to the database server which is supposed to receive the resource from the last known sender). Database server A writes (3) its version of the resource. The resource written by database server A is version 10 of the resource. By this time, the current copy of the resource might be somewhere else if additional requestors demanded the resource. The disk acknowledges when the write is completed (4Ack).

When the write completes, database server A provides database server D with the information that version 10 is now on disk (5 AckW). Database server A voluntarily downgrades its W lock (which it did not ask for in the first place).

The Master (D) goes to database server C and, instead of granting the requested W lock, notifies C that the write completed (6). The Master communicates the current disk version number to the holders of all PI copies, so that all earlier PI copies at C can be released. In this scenario, since database server C has no PI copies older than 10, it down-converts database server C's lock to NULL.

The Master also sends an acknowledgment message to database server B instructing database server B to release its PI copies which are earlier than 10 (7 AckW(10)).

The Distributed Lock Manager

In contrast with conventional DLM logic, the Master in a system that implements the direct-shipping techniques described herein may have incomplete information about lock states at the database servers. According to one embodiment, the Master of a resource maintains the following information and data structures:

(1) a queue of CURR copy requestors (either for modification or for shared access) (the upper limit on the queue length is the number of database servers in the cluster). This queue is referred to herein as the Current Request Queue (CQ).

(2) when a resource is sent to another CURR requestor, the senders lazily (asynchronously in a sense that they do not wait for a acknowledgment) notify the Master about the event. Master keeps track of the last few senders. This is a pointer on the CQ.

(3) the version number of the latest resource version on disk.

(4) W lock grants and a W requests queue.

According to one embodiment, W permission is synchronous: it is granted only by the master, and the master ensures that there is not more than one writer in the cluster for this resource. The Master can make the next grant only after being notified that the previous write completed and the W lock was released. If there are more than one modifier, a W lock is given for the duration of the write and voluntarily released after the write. If there is only one modifier, the modifier can keep the W permission.

(5) a list of H lock holders with their respective resource version numbers.

This provides information (though possibly incomplete) about the PI copies in buffer caches.

Disk Warm Up

Since the direct-shipment techniques described herein significantly segregate the life cycles of the buffer cache images of the resources and the disk images, there is a need to bridge this gap on recovery. According to one embodiment, a new step of recovery, between DLM recovery and buffer cache recovery, is added. This new recovery step is referred to herein as 'disk warm up'.

Although during normal cache operations a master of a resource has only approximate knowledge of the resource location and about the availability of PI and CURR copies, on DLM recovery (which precedes cache recovery), the master of a resource collects complete information about the availability of the latest PI and CURR copies in the buffer caches of surviving database servers. This is true whether or not the master of the resource is a new master (if before the failure the resource was mastered on a failed database server) or a surviving master.

After collecting this information, the Master knows which database server possesses the latest copy of the resource. At 'disk warm up' stage, the master issues a W lock to the owner of this latest copy of the resource (CURR if it is available, and latest PI copy if the CURR copy disappeared together with the failed database server). The master then instructs this database server to write the resource to disk. When the write completes, all other database servers convert their H locks to NULL locks (because the written copy is the latest available). After those locks have been converted, cache recovery can proceed as normal.

Some optimizations are possible during the disk warm up stage. For example, the resource does not necessarily have to be written to disk if the latest image is in the buffer cache of the database server performing recovery.

Alternatives to Lock-based Scheme

Various techniques for directly shipping dirty copies of resources between database servers have been described in the context of a locking scheme that uses special types of locks (M, W and H locks). Specifically, these special locks are used to ensure that (1) only the server with the current version of the resource modifies the resource, (2) all servers keep their PI versions of the resource until the same version or a newer version of the resource is written to disk, and (3) the disk-based version of the resource is not overwritten by an older version of the resource.

However, a lock-based access control scheme is merely one context in which the present invention may be implemented. For example, those same three rules may be enforced using any variety of access control schemes. Thus, present invention is not limited to any particular type of access control scheme.

For example, rather than governing access to a resource based on locks, access may be governed by tokens, where each token represents a particular type of permission. The tokens for a particular resource may be transferred among the parallel servers in a way that ensures that the three rules stated above are enforced.

Similarly, the rules may be enforced using a state-based scheme. In a state-based scheme, a version of a resource changes state in response to events, where the state of a version dictates the type of actions that may be performed on the version. For example, a database server receives the current version of a resource in its "current" state. The current state allows modification of the resource, and writing to disk of the resource. When a database server transfers the current version of the resource to another node, the retained version changes to a "PI writeable" state. In the PI writeable state, the version (1) cannot be modified, (2) cannot be overwritten, but (3) can be written to disk. When any version of the resource is written to disk, all versions that are in PI writeable state that are the same or older than the version that was written to disk are placed in a "PI released" state. In the PI released state, versions can be overwritten, but cannot be modified or written to disk.

Hardware Overview

Figure 6:
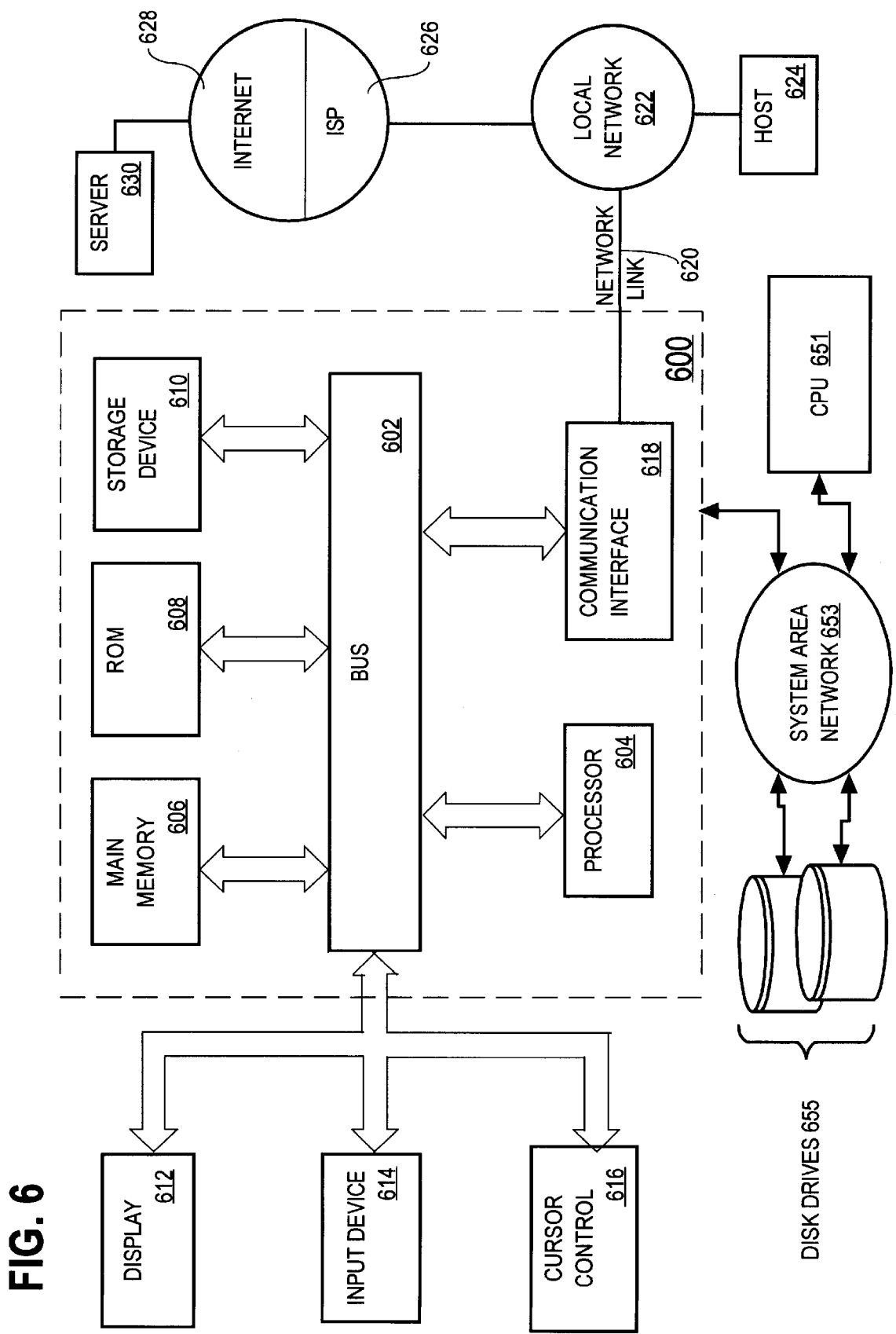
FIG. 6 is a block diagram of a computer system on which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for reducing the overhead associated with a ping. According to one embodiment of the invention, the overhead associated with a ping is reduced by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 belongs to a shared disk system in which data on one or more storage devices (e.g. disk drives 655) are accessible to both computer system 600 and to one or more other CPUs (e.g. CPU 651). In the illustrated system, shared access to the disk drives 655 is provided by a system area network 653. However, various mechanisms may alternatively be used to provide shared access.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

While techniques for handling pings have been described herein with reference to pings that occur when multiple database servers have access to a common persistent storage device, these techniques are not restricted to this context. Specifically, these techniques may be applied in any environment where a process associated with one cache may require a resource whose current version is located in another cache. Such environments include, for example, environments in which text servers on different nodes have access to the same text material, environments in which media servers on different nodes have access to the same video data, etc.

Handling pings using the techniques described herein provides efficient inter-database server transfer of resources so uptime performance scales well with increasing number of database servers, and users per database server. In addition, the techniques result in efficient recovery from single-database server failures (the most common type of failure) that scales well with increasing number of database servers.

Significantly, the techniques described herein handle pings by sending resources via the IPC transport, not through disk intervention. Consequently, disk I/Os for resources that result in a ping are substantially eliminated. A synchronous I/O is involved only as long as it is needed for the log force. In addition, while disk I/O is incurred for checkpointing and buffer cache replacement, such I/O does not slow down the buffer shipment across the cluster.

The direct shipping techniques described herein also tend to reduce the number of context switches incurred by a ping. Specifically, the sequence of round trip messages between the participants of the protocol (requester and holder) and the Master, is substituted by the communication triangle: Requestor, Master, Holder, Requestor.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for recovering a resource after a failure of a plurality of caches that hold dirty versions of said resource, the method comprising the steps of:

determining whether any of the plurality of caches that failed held the latest version of the resource; and if any of the plurality of caches that failed held the latest version of the resource:

determining a subset of failed caches, said subset of failed caches including only those failed caches that updated said resource subsequent to a version of the resource that is durably stored; and merging and applying the recovery logs of the subset of failed caches to reconstruct the latest version of the resource.

2. A computer-readable medium carrying one or more sequences of instructions for recovering a resource after a failure of a plurality of caches that hold dirty versions of said resource, wherein execution of the one or more sequences of instructions by one or more processors causes the one or more processors to perform the steps of:

determining whether any of the failed caches held the latest version of the resource; and if any of the failed caches held the latest version of the resource:

determining a subset of failed caches, said subset of failed caches including only those failed caches that updated said resource subsequent to a version of the resource that is durably stored; and merging and applying the recovery logs of the subset of failed caches to reconstruct the latest version of the resource.

3. An apparatus for recovering a resource after a failure of a plurality of caches that hold dirty versions of said resource, wherein the apparatus is configured to:

determine whether any of the failed caches held the latest version of the resource; and if any of the failed caches held the latest version of the resource, determine a subset of failed caches, said subset of failed caches including only those failed caches that updated said resource subsequent to a version of the resource that is durably stored; and merge and apply the recovery logs of the subset of failed caches to reconstruct the latest version of the resource.

\* \* \* \* \*